United States Patent
Doney

(10) Patent No.: US 7,725,439 B2
(45) Date of Patent: May 25, 2010

(54) HANDLING COLUMN RENAMING AS PART OF SCHEMA EVOLUTION IN A DATA ARCHIVING TOOL

(75) Inventor: Gary Charles Doney, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/833,719

(22) Filed: Aug. 3, 2007

(65) Prior Publication Data

US 2009/0037455 A1 Feb. 5, 2009

(51) Int. Cl.
*G06F 17/30* (2006.01)

(52) U.S. Cl. ............................ 707/661
(58) Field of Classification Search ........... 707/2, 707/201, 661; 713/400; 715/222
See application file for complete search history.

(56) References Cited

U.S. PATENT DOCUMENTS

| | | | | |
|---|---|---|---|---|
| 5,491,818 | A * | 2/1996 | Malatesta et al. ........... 707/201 |
| 5,893,129 | A * | 4/1999 | Pollard ........................ 715/222 |
| 6,615,204 | B1 | 9/2003 | Menon |
| 6,965,899 | B1 | 11/2005 | Subramaniam et al. |
| 2002/0174142 | A1 | 11/2002 | Demers et al. |
| 2003/0217292 | A1* | 11/2003 | Steiger et al. ............... 713/201 |
| 2004/0153435 | A1 | 8/2004 | Gudbjartsson et al. |
| 2005/0149542 | A1 | 7/2005 | Cosic |
| 2006/0047713 | A1* | 3/2006 | Gornshtein et al. ......... 707/202 |
| 2006/0242444 | A1* | 10/2006 | Novik et al. ................ 713/400 |

* cited by examiner

*Primary Examiner*—Etienne P LeRoux
(74) *Attorney, Agent, or Firm*—Mollborn Patents, Inc.; Fredrik Mollborn

(57) ABSTRACT

Methods and apparatus, including computer program products, implementing and using techniques for managing database table schema evolution. It is detected whether any columns in a source table have been renamed since a previous archiving process. A set of table changes is generated for the renamed columns. It is detected whether any possible naming collisions exist in the set of table changes. If a possible naming collision is detected, a temporary rename is created for the renamed column. The set of table changes, including any created temporary renames, is sorted.

27 Claims, 2 Drawing Sheets

| COL1 | COL2 | COL3 |
|------|------|------|
|      |      |      |
|      |      |      |
|      |      |      |

FIG. 1A

| COL1 | COL2X | COL3 |
|------|-------|------|
|      |       |      |
|      |       |      |
|      |       |      |

FIG. 1B

| COL1 | COL2X | COL3X |
|------|-------|-------|
|      |       |       |
|      |       |       |
|      |       |       |

FIG. 1C

| COL2 | COL2X | COL3X |
|------|-------|-------|
|      |       |       |
|      |       |       |
|      |       |       |

FIG. 1D

| COL2 | COL1 | COL3X |
|------|------|-------|
|      |      |       |
|      |      |       |
|      |      |       |

FIG. 1E

| COL2 | COL1 | COL3X | COL3 |
|------|------|-------|------|
|      |      |       |      |
|      |      |       |      |
|      |      |       |      |

FIG. 1F

HANDLING COLUMN RENAMING AS PART OF SCHEMA EVOLUTION IN A DATA ARCHIVING TOOL

BACKGROUND

This invention relates to efficient management and storage of data objects within databases. Database applications typically evolve over time. Changes are made to support new features, and old features are deleted. Changes to a database application typically require changing database objects. For example, database tables can be changed by adding or deleting columns, views can be modified to support changes in the table shape, and even whole tables can be added or deleted. The changes that occur to an application's database tables over time are typically referred to as database table schema evolution.

Database table schema evolution can cause problems in a data archiving tool because repeated runs of an archiving specification use the same set of tables over time. In the course of setting up an initial archive run, a specification is created that records the column information for all the tables that are to be archived. This set of tables is typically known as an "archive unit." The recorded column information is needed for validation checks on the initial archiving run and on all later archiving runs. The validation checks ensure that the proper number, name, and column types, as well as other information, exist in the source tables prior to each archiving run.

One of the key purposes of a data archiving tool is to use the tool to preserve information over a long period of time. As a result, it is likely that the schemas of the tables will require changes, as other applications that use those tables change over time, thereby requiring that the tables evolve.

Various data archiving tools, such as the DB2 Data Archive Expert tool by International Business Machines of Armonk, N.Y., permit users to add new columns to existing source tables, but do not permit any other changes to be made to the source tables. Adding the capability in data archiving tools for users to rename columns in the source tables, either independently or in conjunction with adding further columns to the source tables, can lead to various problems unless special considerations are made. For example, the addition or renaming of columns could cause a naming collision if the detected changes are applied serially to the corresponding target archive tables.

One such case is illustrated in FIGS. 1A-F. Assume, for example, that a user starts with a three-column table, TAB1, as illustrated in FIG. 1A. On the first run, the selected source data from TAB1 is archived to a target archive table, ARCHTAB1. ARCHTAB1 has the same three columns as TAB1, plus additional columns that store information specific to the archiving tool (for example, archive timestamp and sequence information). Over time, the following updates are applied to the table in the order shown:
1. COL2 is renamed to COL2X, resulting in the table shown in FIG. 1B.
2. COL3 is renamed to COL3X, resulting in the table shown in FIG. 1C.
3. COL1 is renamed to COL2, resulting in the table shown in FIG. 1D.
4. COL2X is renamed to COL1, resulting in the table shown in FIG. 1E.
5. A new column COL3 is added to the table, resulting in the table shown in FIG. 1F.

If at this point, the user were to run the archive specification again, the data would either be archived to the wrong columns (assuming only name is considered and that the types of all three columns are the same), or the archive run would fail. Thus, there is a need for improved schema evolution.

SUMMARY

In general, in one aspect, the invention provides methods and apparatus, including computer program products, implementing and using techniques for managing database table schema evolution. It is detected whether any columns in a source table have been renamed since a previous archiving process. A set of table changes is generated for the renamed columns. It is detected whether any possible naming collisions exist in the set of table changes. If a possible naming collision is detected, a temporary rename is created for the renamed column. The set of table changes, including any created temporary renames, is sorted.

The invention can be implemented to include one or more of the following advantages. Users can continue to run the same archive specification over time and name collisions can be avoided by detecting them and providing a way around them without knowing the actual order or makeup of the changes that the user provided. The flexibility in allowing naming collisions to loom ensures that the user does not need to keep track of what version of the table was last archived or to run the archiving specification once after each change to the table. Potential naming collisions can loom, and the tool provides a schema evolution sequence to update the target archive tables to match the source tables.

The details of one or more embodiments of the invention are set forth in the accompanying drawings and the description below. Other features and advantages of the invention will be apparent from the description and drawings, and from the claims.

DESCRIPTION OF DRAWINGS

FIGS. 1A-1F shows a series of column renames and column additions performed by a user, which may result in naming conflicts in a data archiving tool.

Like reference symbols in the various drawings indicate like elements.

DETAILED DESCRIPTION

Overview

Figure 2:
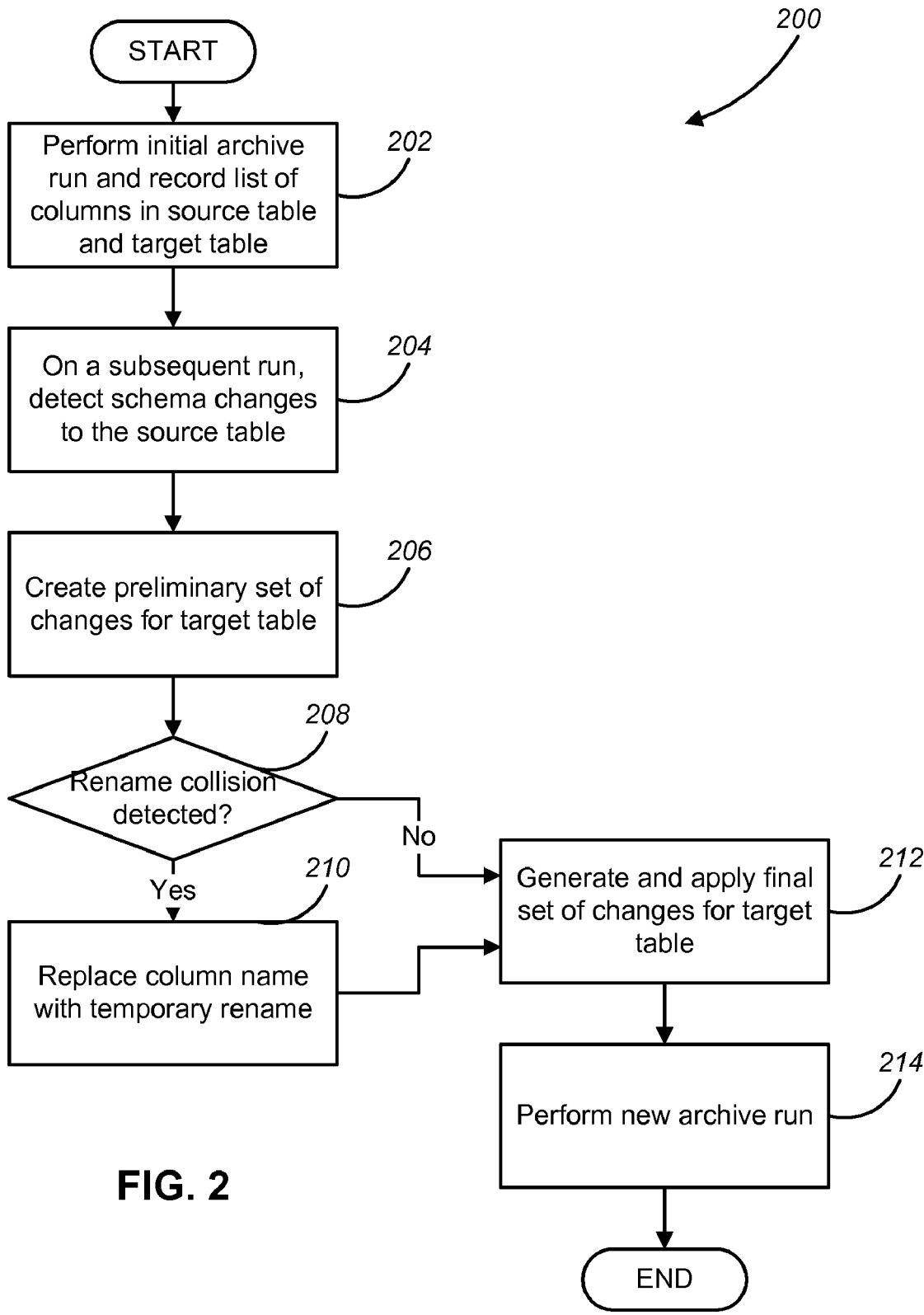
FIG. 2 shows an exemplary data archiving process in accordance with one embodiment of the invention.

As was described above, the various embodiments of the invention provide a way to detect which columns in the source tables have been renamed and added, to generate the required ALTER statements for renamed and added columns, then to sort the ALTER statements and create temporary rename ALTER statements, if needed, to avoid name collisions. Once all the actual and temporary renames and ADD statements are created and properly ordered, they are applied to the target archive tables for the archive units before running the archive process, so that the data in the source tables can be properly archived into the updated target archive tables. The invention will now be described in further detail by way of example and with reference to FIG. 2, which shows an exemplary process for performing a data archiving process (200) in accordance with one embodiment of the invention. It should be noted that the following description is focused on a single source table and a single target archive table for ease of understanding, but the principles described herein can of course be applied to any number of source and target archive tables, as may be required by the archiving process at hand.

As can be seen in FIG. 2, the process (200) starts by performing an initial archive run to create a target archive table from a source table in the archive unit, unless such a target archive table has already been created by a user (step 202). During the initial archive run, a first list is created with the names of the columns that are in the source table and a second list is created with the names of the columns that are in the target archive table. These lists are stored in the data archiving tool's metadata, which is a series of database tables containing information about the archiving tool, the archive (and retrieve) specifications, and prior runs of the specifications.

Next, a set of schema changes are detected on the source table in the archive unit (step 204). That is, a set of renames and/or additions of columns are made to the source table, resulting in a source table where one or more of the column names and/or the total number of columns has changed. The next time the specification is run, the current version of the source table in the database catalog is compared with the source table information recorded in the archiving tool metadata the last time that the specification was run to detect any changes, such as renamed columns and/or added columns. The database catalog is part of the database, and contains information about all the tables, indexes, and so on, that form the objects of the database.

From this, a set of updates is created that need to be applied to the corresponding target archive table in order to bring the target archive table back in synch with the new version of the source table (step 206). In one embodiment the set of updates is represented as a vector, but as the skilled person realizes other forms are also possible, such as any data structure that keeps track of the order of the changes, for example, a simple array. In some embodiments, the columns are processed and compared serially (by column number in the catalog), so that it is first determined which columns have been renamed, and then which columns have been added. From this, it gets a list of changes for which ALTER statements need to be generated.

Next, the generated set of changes is checked to determine whether any naming collisions will occur during their execution (step 208). Thus, at this point, the set of changes can be thought of as being composed of two logical parts; the list of renames, and the list of ADD statements. If it is detected that a given rename will cause a naming collision, the name is replaced with a temporary rename (step 210). In some embodiments, in order to avoid a naming collision with the temporary name, the temporary rename uses a prefix that the user may not use in source table columns, that is, the temporary rename is generated automatically from a set of names not available to the user of the database. This ensures that a temporary rename will not cause a naming collision itself After replacing all possible naming collisions, a final set of updates is generated (step 212), which contains the temporary renames and the renames that do not cause a naming collision, organized in sequence, and followed by the ALTER statements needed for the adds. For a given target archive table, this final set of updates forms the SQL statements that will alter the target archive table from its existing schema to the new schema that is compatible with the corresponding source table. The updated target archive table can then be used to perform a new archive run (step 214), which ends the process.

Below is an example of how the process (200) of FIG. 2 applies to the example discussed above with reference to FIG. 1, and what the final set of ALTER statements will be like once they are generated. As was discussed above with respect to FIG. 1, the renames and ADD statements generated in the potential set of updates in step 208 are:
Renames: COL1→COL2
    COL2→COL1
    COL3→COL3X
Adds: COL3

The collision detection step 208 and replacement step 210 of FIG. 2 then perform the following replacements and saves the collisions for later.
Renames: COL1→AHX_1 [COL1→COL2 do later
    COL2→AHX_2 [COL2→COL1 do later
    COL3→COL3X
Adds: COL3

Next, the final set of updates is generated, as described above with respect to step 212. The temporary renames are replaced with the original target column names as follows.
Renames: COL1→AHX_1
    COL2→AHX_2
    COL3→COL3X
    AHX_1→COL2
    AHX_2→COL1
Adds: COL3

Finally, the ALTER statements are generated as follows:
Renames: ALTER TABLE ARCHTAB1 RENAME COLUMN COL1 TO AHX_1;
    ALTER TABLE ARCHTAB1 RENAME COLUMN COL2 TO AHX_2;
    ALTER TABLE ARCHTAB1 RENAME COLUMN COL3 TO COL3X;
    ALTER TABLE ARCHTAB1 RENAME COLUMN AHX_1 TO COL2;
    ALTER TABLE ARCHTAB1 RENAME COLUMN AHX_2 TO COL1;
Adds: ALTER TABLE ARCHTAB1 ADD COL3 INTEGER WITH DEFAULT 3;

Efficiency and Further Optimization

As the skilled reader realizes, for a table that starts with n source columns, at most 2n renames would be required, assuming that all columns would have a collision—once to give each column a temporary rename, and then once to name the column with the new target name. Thus the renames scale linearly with the number of columns. This can be further optimized by examining which renames could be done first in order to obviate the need for temporary renames. That is, by determining an order for the temporary renames, the total number of temporary renames may be reduced. For example, in this case, after the first temporary rename is done, the second rename could proceed without a temporary rename. This would result in the following solution as applied to the example presented above:

Temporary renames:
Renames: COL→AHX_1 [COL1 →COL2 do later and undo the temporary rename
    COL2→COL1 (temporary rename not needed)
    COL3→COL3X
    AHX_1→COL2
Adds: COL3

Generating the ALTER statements:
Renames: ALTER TABLE ARCHTAB1 RENAME COLUMN COL1 TO AHX_1;
    ALTER TABLE ARCHTAB1 RENAME COLUMN COL2 TO COL1;
    ALTER TABLE ARCHTAB1 RENAME COLUMN COL3 TO COL3X;
    ALTER TABLE ARCHTAB1 RENAME COLUMN AHX_1 TO COL2;

Adds: ALTER TABLE ARCHTAB1 ADD COL3 INTEGER WITH DEFAULT 3;

This concept can be applied in reverse during the process of retrieving data from the archives when the data is retrieved to tables other than the original source tables. In that case, the retrieve target archive tables need to have schema modifications applied to them in order to keep up with the changes made to the archived target tables, which themselves act as source tables during retrieval.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

A number of implementations of the invention have been described. Nevertheless, it will be understood that various modifications may be made without departing from the spirit and scope of the invention. For example, temporary column names could be generated in some random way. Before being used as the target of a temporary column rename, the tool could check that the temporary target column name is not the same as any of the column names in the table, or any of the target column names that would be used in the rename operations, both of which are finite lists. Accordingly, other embodiments are within the scope of the following claims.

The invention claimed is:

1. A computer-implemented method for managing database table schema evolution, the method comprising:

performing an initial archiving run to archive data from a source table into a target archive table corresponding to the source table;

detecting whether any columns in the source table have been renamed since a previous archiving process;

generating a set of table changes for the renamed columns;

detecting whether any possible naming collisions exist in the set of table changes;

in response to detecting a possible naming collision, creating a temporary rename for each renamed column;

sorting the set of table changes including any created temporary renames; and applying the sorted set of table changes to the target archive table to create an updated target archive table.

2. The method of claim 1, wherein applying the sorted set of table changes includes replacing each temporary rename with the original target column name.

3. The method of claim 1, further comprising archiving the data in the source table into the updated target archive table.

4. The method of claim 1, further comprising:

generating a list including the column names of the source table; and generating a list including the column names of the target archive table.

5. The method of claim 4, wherein detecting whether any columns in the source table have been renamed includes comparing a current version of the source table with the list including the column names of the source table.

6. The method of claim 1, wherein the set of table changes is represented by a vector.

7. The method of claim 1, wherein each temporary rename is generated automatically from a set of names not available to a user of the database.

8. The method of claim 1, wherein sorting comprises determining an order for the temporary renames such that the total number of temporary renames is reduced.

9. The method of claim 1, further comprising:

detecting whether any columns in a source table have been added since a previous archiving process; and wherein the set of table changes includes both the renamed columns and the added columns.

10. A computer program product comprising a computer useable medium including a computer readable program, wherein the computer-readable program when executed on a computer causes the computer to:

perform an initial archiving run to archive data from a source table into a target archive table corresponding to the source table;

detect whether any columns in the source table have been renamed since a previous archiving process;

generate a set of table changes for the renamed columns;

detect whether any possible naming collisions exist in the set of table changes;

in response to detecting a possible naming collision, create a temporary rename for each renamed column;

sort the set of table changes including any created temporary renames; and apply the sorted set of table changes to the target archive table to create an updated target archive table.

11. The computer program product of claim 10, wherein applying the sorted set of table changes causes the computer to replace each temporary rename with the original target column name.

12. The computer program product of claim 10, further causing the computer to archive the data in the source table into the updated target archive table.

13. The computer program product of claim 10, further causing the computer to:
   generate a list including the column names of the source table; and
   generate a list including the column names of the target archive table.

14. The computer program product of claim 13, wherein detecting whether any columns in the source table have been renamed causes the computer to compare a current version of the source table with the list including the column names of the source table.

15. The computer program product of claim 10, wherein the set of table changes is represented by a vector.

16. The computer program product of claim 10, wherein each temporary rename is generated automatically from a set of names not available to a user of the database.

17. The computer program product of claim 10 wherein sorting comprises determining an order for the temporary renames such that the total number of temporary renames is reduced.

18. The computer program product of claim 10, further causing the computer to:
   detect whether any columns in a source table have been added since a previous archiving process; and
   wherein the set of table changes includes both the renamed columns and the added columns.

19. A system for managing database table schema evolution, the system comprising:
   means for performing an initial archiving run to archive data from a source table into a target archive table corresponding to the source table;
   means for detecting whether any columns in the source table have been renamed since a previous archiving process;
   means for generating a set of table changes for the renamed columns;
   means for detecting whether any possible naming collisions exist in the set of table changes;
   means for, in response to detecting a possible naming collision, creating a temporary rename for each renamed column;
   means for sorting the set of table changes including any created temporary renames; and
   means for applying the sorted set of table changes to the target archive table to create an undated target archive table.

20. The system of claim 19, wherein the means for applying the sorted set of table changes includes means for replacing each temporary rename with the original target column name.

21. The system of claim 19, further comprising means for archiving the data in the source table into the updated target archive table.

22. The system of claim 19, further comprising:
   means for generating a list including the column names of the source table; and
   means for generating a list including the column names of the target archive table.

23. The system of claim 22, wherein the means for detecting whether any columns in the source table have been renamed includes means for comparing a current version of the source table with the list including the column names of the source table.

24. The system of claim 19, wherein the set of table changes is represented by a vector.

25. The system of claim 19, wherein each temporary rename is generated automatically from a set of names not available to a user of the database.

26. The system of claim 19 wherein the means for sorting comprises means for determining an order for the temporary renames such that the total number of temporary renames is reduced.

27. The system of claim 19, further comprising:
   means for detecting whether any columns in a source table have been added since a previous archiving process; and
   wherein the set of table changes includes both the renamed columns and the added columns.

* * * * *